US009575615B1

(12) United States Patent
Nicholls et al.

(10) Patent No.: US 9,575,615 B1
(45) Date of Patent: Feb. 21, 2017

(54) PRESENTING SUPPLEMENTAL CONTENT

(75) Inventors: Nanyan Nicholls, Seattle, WA (US); Samuel P. Hall, VI, Bellevue, WA (US); Gregory M. Hart, Mercer Island, WA (US); Jeffrey P. Bezos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1102 days.

(21) Appl. No.: 13/069,193

(22) Filed: Mar. 22, 2011

(51) Int. Cl.
*G06F 3/048* (2013.01)

(52) U.S. Cl.
CPC .................................. *G06F 3/048* (2013.01)

(58) Field of Classification Search
CPC G06F 3/04815; G06F 3/0482; G06F 3/04842; G06F 21/602; G06F 1/1637; G06F 2200/1637; G06F 3/0484; G06F 21/10; G06F 2200/1614; G06F 2221/0784; G06F 1/1626; G06F 1/1694; G06F 3/012; G06F 3/048
USPC .................................. 715/781, 800; 345/158
See application file for complete search history.

(56) References Cited

U.S. PATENT DOCUMENTS

| | | | |
|---|---|---|---|
| 6,282,548 B1 | 8/2001 | Burner et al. | |
| 6,539,406 B1 | 3/2003 | Ibarra et al. | |
| 7,257,604 B1 | 8/2007 | Wolfe | |
| 7,975,020 B1 | 7/2011 | Green et al. | |
| 8,347,211 B1* | 1/2013 | Rogers, III | G06Q 30/0601 715/716 |
| 8,659,553 B1* | 2/2014 | Chan et al. | 345/169 |
| 2003/0212762 A1 | 11/2003 | Barnes et al. | |
| 2005/0010952 A1* | 1/2005 | Gleissner et al. | 725/46 |
| 2006/0242574 A1 | 10/2006 | Richardson et al. | |
| 2007/0234213 A1 | 10/2007 | Krikorian et al. | |
| 2008/0189319 A1* | 8/2008 | Nielen et al. | 707/102 |
| 2009/0150920 A1* | 6/2009 | Jones | G06Q 30/02 725/23 |
| 2009/0187485 A1 | 7/2009 | Loui et al. | |
| 2009/0259956 A1* | 10/2009 | Barsook et al. | 715/764 |
| 2012/0050161 A1* | 3/2012 | Andersson et al. | 345/158 |
| 2012/0062473 A1* | 3/2012 | Xiao et al. | 345/173 |
| 2012/0096344 A1 | 4/2012 | Ho et al. | |
| 2012/0192118 A1 | 7/2012 | Migos et al. | |
| 2013/0085855 A1 | 4/2013 | Dyor et al. | |
| 2013/0111395 A1 | 5/2013 | Ying et al. | |
| 2013/0135221 A1 | 5/2013 | Ainslie et al. | |

OTHER PUBLICATIONS

Official Communication for U.S. Appl. No. 13/737,596 dated May 20, 2015.

\* cited by examiner

*Primary Examiner* — Di Xiao
(74) *Attorney, Agent, or Firm* — Knobbe, Martens, Olson & Bear, LLP

(57) ABSTRACT

A user of a computing device may view an initial content item in a landscape orientation on a display of a computing device. When the user rotates the computing device, supplemental content may be presented in a portrait orientation on the display of the computing device. The supplemental content may include virtually any information in which the user may be interested and/or that is related or similar to the content item. Accordingly, rather than presenting such supplemental content upon an affirmative request or search by the user, the supplemental content is presented to the user automatically when the user rotates the computing device from a landscape position to a portrait position or vice versa.

26 Claims, 9 Drawing Sheets

PRESENTING SUPPLEMENTAL CONTENT

BACKGROUND

The continued proliferation of digital content items has led to an increase in the availability of such content items, as well as an increase in the availability of electronic computing devices used for consuming these content items. For instance, users now consume electronic books, videos, songs, documents, webpages, images, applications, etc. on an assortment of stationary and/or portable computing devices. As the number of content items and devices continues to increase, users become increasingly interested in enhancing their experiences while consuming these content items. For example, while consuming an item of digital content, users are often naturally curious about information that is related to the content item and/or that is similar to the content item. However, given the vast amount of information that can be considered related or similar to the content item being consumed by the user, and given a user's desire to efficiently and quickly navigate such information, a typical user would generally prefer to have such information automatically presented to her via her computing device, rather than actively seek out such information.

DETAILED DESCRIPTION

Generally described, aspects of the present disclosure relate to presenting an initial content item in a first orientation on a display of a computing device and automatically presenting supplemental content in a second orientation on the display following detection of a user interaction with the computing device. For example, a user of a computing device may view a content item in a landscape orientation on the display of the computing device. The content item presented in the landscape orientation may be optimized for aesthetic reasons or may simply be presented in its original form. However, when the user interacts with the computing device (e.g., when the user rotates the computing device from a landscape position to a portrait position), supplemental content may be presented in a portrait orientation on the display of the computing device. The supplemental content may include virtually any information in which the user may be interested and/or that is related or similar to the initial content. Accordingly, rather than presenting such supplemental content upon an affirmative request or search by the user, the supplemental content is presented to the user automatically when the user interacts with the computing device, e.g., when rotating the computing device from a landscape position to a portrait position and vice versa, among other possible user interactions. In one alternative, the supplemental content to be displayed when the computing device is in a second orientation is selected by the user and stored in an external memory separate from the computing device.

Figure 1:
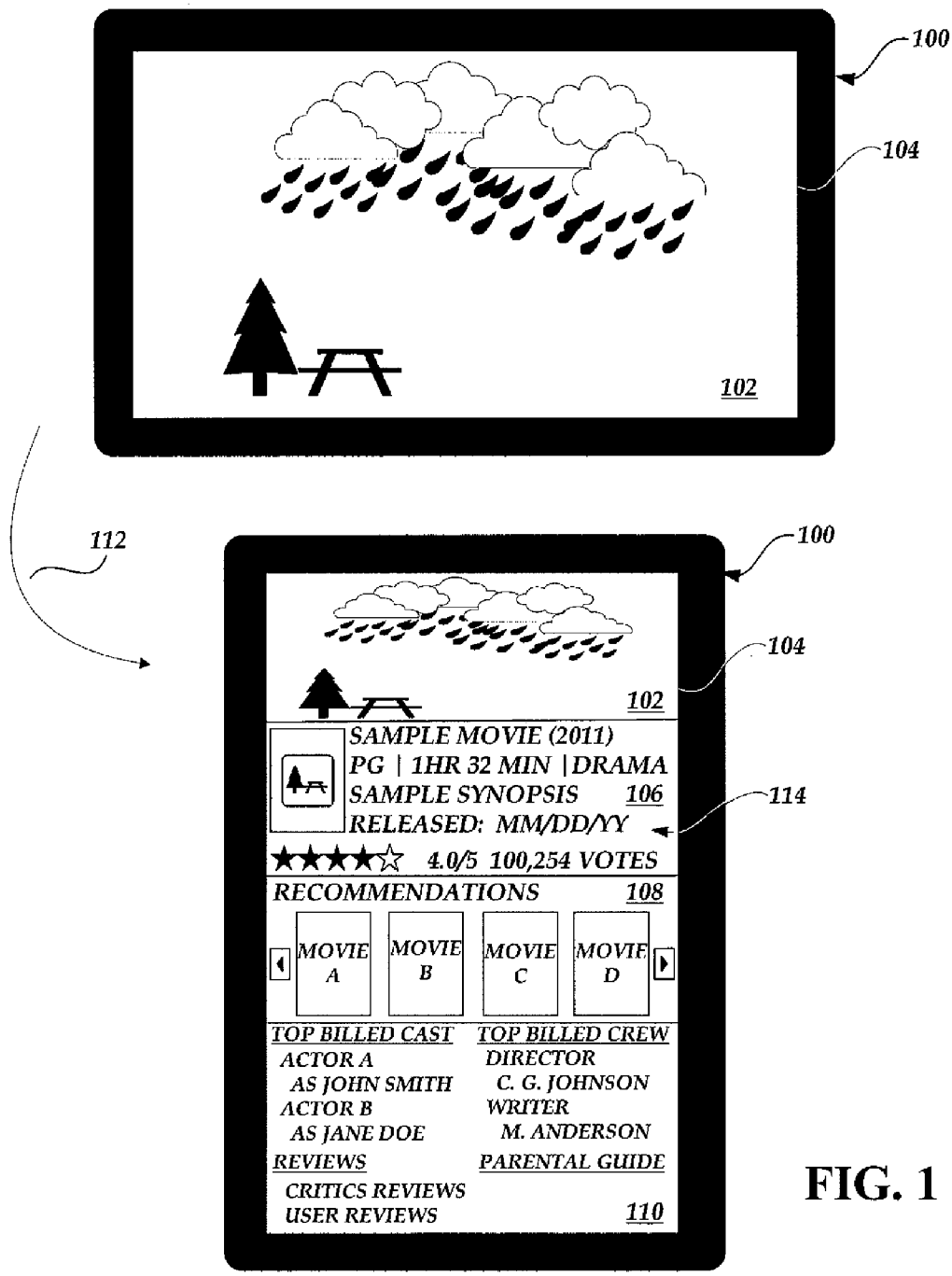
FIGS. 1 and 2 are pictorial diagrams of a computing device having a display upon which a content item is presented in a first orientation and upon which supplemental content is presented in a second orientation following detection of a user interaction with the computing device, the detection occurring while the content item is being presented in the first orientation in relation to the display.

FIG. 1 depicts a practical example of a presentation of such supplemental content in a second orientation following detection of a user interaction with a computing device 100, the detection occurring while the content item is being displayed in a first orientation with respect to the display. As depicted in FIG. 1, an initial content item 102 (e.g., a movie in the illustrated example) is displayed in a first (e.g., landscape) orientation on a display 104 of a computing device 100. When the user interacts with (e.g., rotates) the computing device 100, as indicated by arrow 112, supplemental content 114 to the content item 102 is presented in a portrait orientation on the display 104 of the computing device 100. Thus, when the content item is displayed in the portrait orientation, the content item is in a different angular position with respect to the display than when it was displayed in the landscape orientation. In the illustrated example, the supplemental content 114 includes the content item 102 previously presented on the display 104 (albeit in smaller form), as well as additional information related to the content item 102 and/or of possible interest to the user. The depicted supplemental content/additional information includes metadata 106 related to the movie, such as a thumbnail image of DVD cover for the movie, movie title, movie rating, duration, movie category, movie synopsis, release date and customer review rating. The depicted additional information also includes recommendations 108 for other movies that may be of interest to the user. Finally, the additional information in the illustrated example includes other miscellaneous data 110 for the movie, such as information identifying the movie's cast members and the movie's crew, as well as movie reviews and a parental guide to the movie.

Figure 2:
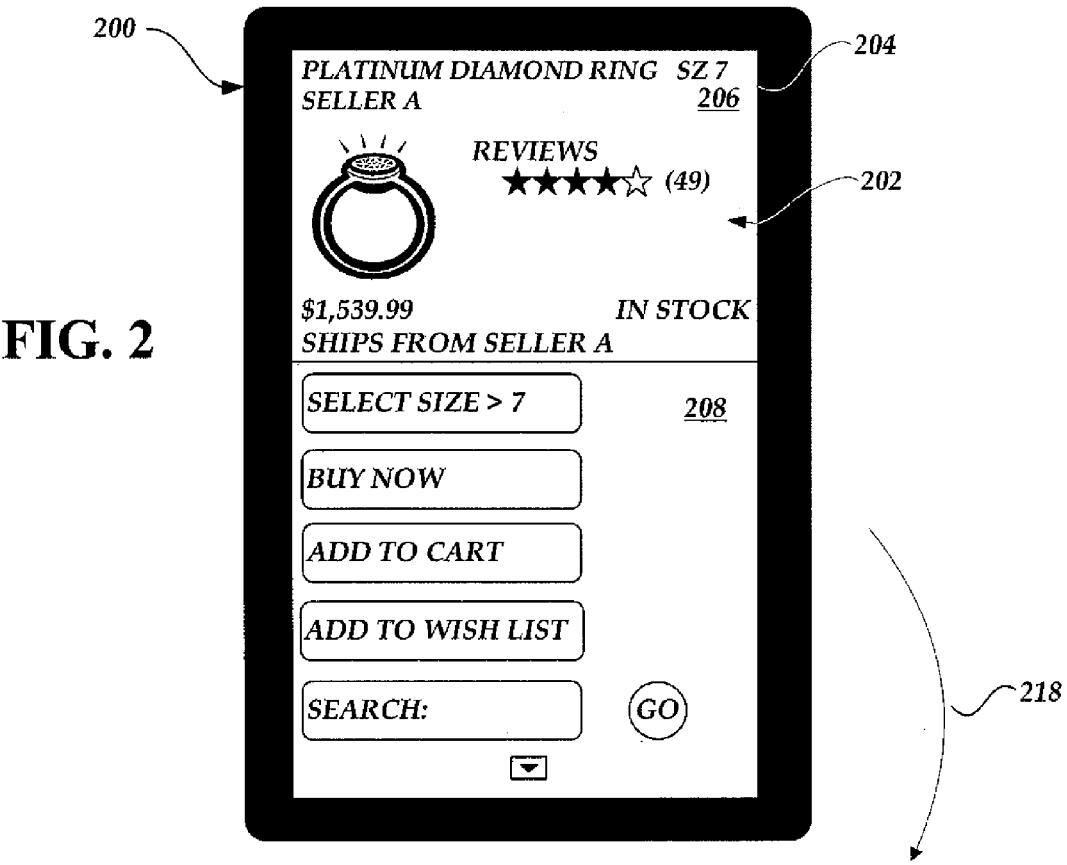
Figure 2:

Another practical example of presentation of supplemental content in accordance with the present disclosure is illustrated in FIG. 2. In FIG. 2, an initial content item 202 is presented in a portrait orientation on a display 204 of a computing device 200. In the illustrated example, the content item 202 is a webpage describing an item available for purchase from a retail website. More specifically, in the illustrated example, the item available for purchase is a platinum diamond ring and the webpage includes metadata 206 related to the ring, such as an image of the ring, a customer review rating for the ring, seller data, price data and availability data. In addition, in the illustrated example, the webpage includes various software selection/controls 208 for purchasing the ring, adding the ring to an electronic shopping cart or wish list and searching for related items available for purchase. When the user interacts with the computing device 200 (e.g., when the user rotates the computing device 200 from a portrait position to a landscape position) as indicated by the direction of arrow 218, and such interaction is detected, supplemental content 214 is automatically presented in a second orientation on the display 204 of the computing device 200. The illustrated supplemental content 214 includes video content 210 related to the ring, as well as search results 212 related to the ring. As will be appreciated from the illustrated example, a user who is browsing a website may automatically be presented with additional information related to a webpage (or contents within a webpage) simply by rotating his or her computing device, and thus, the user is not required to actively search for such information. This can result in quicker and more efficient navigation of information related to the content item and/or of interest to the user, without requiring affirmative input by the user. Moreover, presenting the supplemental content item in an alternative orientation may allow for a more aesthetically pleasing presentation of the content item than in the first orientation.

Although specific examples are provided in FIGS. 1 and 2, those skilled in the relevant art will appreciate that the supplemental content may include virtually any type of information that may be related to the initial content item and/or be of interest to the user and that a content item may include any form of digital content. Accordingly, the terms "content," "digital content" and "content item" are interchangeable herein. Examples of content items include, but are not limited to, music, songs, albums, movies, television shows, television broadcasts, radio broadcasts, videos, video games, documents, audio books, electronic books ("eBooks"), images, maps, articles, webpages or other multimedia works. Supplemental content for such content items may also include digital content, e.g., movies, webpages, documents, etc. and can provide additional information regarding the content item. In some embodiments, the supplemental content includes information typically presented with or as part of the content item in the first orientation, but this supplemental content is perhaps removed from the presentation in the first orientation so as to simplify or "de-clutter" said presentation. Although described as supplemental content or secondary content, it should be understood this content could include a different form of the initial content. In some embodiments, the supplemental content could be a different version, format or size of the initial content. For example, the supplemental content could be a version of the original content in a different resolution or displayed using 3D technology. The information may then be presented on the display 104 in the second orientation following user interaction with the computing device 100. In other embodiments, the supplemental content information includes information obtained independently from the content item. In some embodiments, the supplemental content may be displayed to the user in the second orientation with the original content or, in other embodiments, may be displayed on its own.

Given the above, one can provide an almost limitless number of practical examples in which aspects of the present disclosure may be implemented. For instance, with respect to the example illustrated in FIG. 1, the supplemental content 114 may include additional information that is related not only to the movie presented in the first orientation, but to the particular scene of the movie presented in the first orientation. With respect to the example illustrated in FIG. 2, the supplemental content 214 may include information that may be removed from the webpage presented in the first orientation in order to simplify the presentation or make the presentation more aesthetically pleasing. For instance, the price data, customer review rating, seller data, availability data and software controls could be removed from the webpage and instead included in the supplemental content. Accordingly, only the image and brief description of the ring offered for purchase on the webpage may be presented in the first orientation to the user. Although FIGS. 1 and 2 depict only two orientations, in some embodiments different supplemental content can be provided when the device is oriented to one of any number of alternative orientations (e.g., a third orientation). For example, different supplemental content can be displayed if device 200 is rotated clockwise in the direction of arrow 218 another ninety degrees. In one example, the device 200 may be configured to display different supplemental content in any angular position with respect to the display for every defined or selected amount of rotation (e.g., every 15 degrees). Further, the association of the display with the various supplemental content is not limited to the device being oriented along any particular degree of freedom but could be associated with the device being rotated along any combination of the X, Y and Z axes.

As yet another example, the content item presented in the first orientation on the display of the computing device may be an image or movie clip of a person, place or object, and the supplemental content item may include video or audio content featuring the person, place or object; biographical or historical information regarding the person, place or object; links to other information relating to or referencing the person, place or object; other images of the person, place or object; search results for the person, place or object; etc. Accordingly, whenever a user rotates the computing device (or otherwise interacts with the computing devices as described below in other embodiments) while the image of the person, place or object is being presented in a first orientation on the display of the computing device, such supplemental content is automatically presented in a second orientation on the display without requiring the user to actively seek the information included in such supplemental content.

Figure 3:
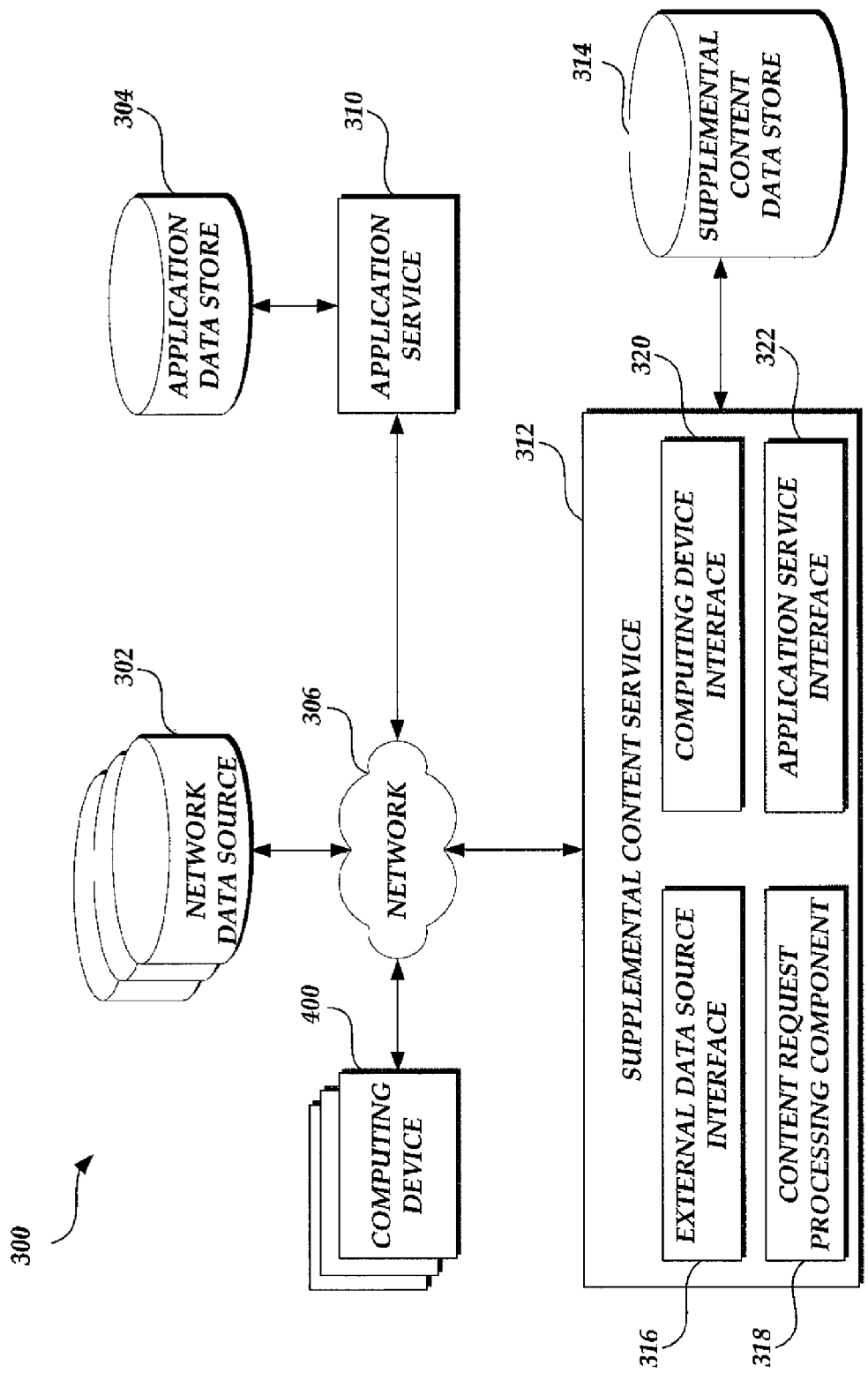
FIG. 3 is a block diagram illustrative of an operating environment in which supplemental content may be provided to a computing device for presentation in a second orientation.

With reference now to FIG. 3, a block diagram illustrative of an operating environment 300 is described in which supplemental content for an initial content item may be provided for presentation in a second orientation following detection of user interaction with the computing device, the detection occurring while the content item is being presented in a first orientation with respect to the display of the computing device. The operating environment 300 may include a supplemental content service 312 that obtains and/or generates supplemental content related to a content item in response to a request from the computing device 400. As described above, the supplemental content may be associated with a content item being presented in a first orientation on the display of the computing device 400 and is configured to be presented in a second orientation on the display of the computing device following user interaction with the device. In one embodiment, information used to generate supplemental content is stored in a supplemental content data store 314 accessible by the supplemental content service 312. While the supplemental content data store 314 is depicted in FIG. 3 as being local to the supplemental content service 312, those skilled in the relevant art will appreciate that the supplemental content data store 314 may be remote from the supplemental content service 312 and/or may be a network-based service itself. Supplemental content information may include, but is not limited to metadata associated with the content item, recommendations data, related links data or other digital content, among others. One skilled in the art will appreciate that supplemental content information may include virtually any type of data that may be related to the content item and/or of interest to the user with respect to the content item. Moreover, the supplemental content item may itself be a webpage, a document, an image, a software application, etc. or may be an overlay of information that is presented in conjunction with the content item.

All or a portion of the supplemental content information for a content item may be obtained from external sources rather than the supplemental content data store 314. Such external sources may include, but are not limited to, network data sources 302, other computing devices 400 and application services 310. Network data sources 302 may include but are not limited to websites, social network services, telecommunication services, microblog services, content feed services, e-commerce services, etc. In one embodiment, the application service 310 stores one or more software applications in an application data store 304 and makes such applications available to others for free, purchase or rental. The applications made available by the application service can be developed for use with smaller, hand-held computing devices, but can also be used with other computing devices without departing from the scope of the present disclosure. Such applications can be pre-installed on computing devices or downloaded by users from one or more application services 310. Those skilled in the art will appreciate that either or both of the content item and the supplemental content item described herein may be an application.

While the supplemental content service 312 and the application service 310 are each depicted in FIG. 3 as implemented by a single computing device in the operating environment 300, this is illustrative only. Each of the supplemental content service 312 and the application service 310 may be embodied in a plurality of computing devices, each executing an instance of the supplemental content service 312 or application service 310, respectively. A server or other computing device implementing the supplemental content service 312 or the application service 310 may include memory, processing unit(s) and computer-readable medium drive(s), all of which may communicate with one another by way of a communication bus. A network interface may provide connectivity over a network 306 and/or other networks or computing systems. The processing unit(s) may communicate to and from memory containing program instructions that the processing unit(s) executes in order to operate the service. The memory generally includes RAM, ROM and/or other non-transitory and auxiliary memory.

As illustrated in FIG. 3, the supplemental content service 312 can include a computing device interface 320 for receiving and transmitting requests for supplemental content from computing device 400, an external data source 316 for obtaining supplemental content information from network data sources 302 and an application service interface 322 for obtaining applications which, as described above, may themselves be supplemental content from application service 310. The supplemental content service 312 can further include a content request processing component 318 for processing requests for supplemental content received from one or more computing devices 400, generating requested supplemental content and ultimately publishing supplemental content.

One skilled in the relevant art will appreciate that the supplemental content service 312 may correspond to a number of computing devices, such as server computing devices. Additionally, the external data source interface 316, the content request processing component 318, the computing device interface 320 and the application service interface 322 may be implemented in a single computing device, or component, or across multiple computing devices or components. In addition, all or some of the functions of the external data source interface 316, the content request component 318, the computing device interface 320 and the application service interface 322 may be combined and implemented in a single component or computing device. One skilled in the relevant art will also appreciate that the supplemental content service 312 may include any one of a number of additional hardware and software components that would be utilized in the illustrative computerized operating environment to carry out the illustrative functions of the supplemental content service 312 and/or any of the individually identified components.

With continued reference to FIG. 3, the operating environment 300 may include any number of computing devices 400, each associated with a user to whom a supplemental content item may be presented as described above. In one embodiment, the computing device 400 is a mobile phone that offers advanced computing ability and connectivity. Such mobile computing devices are commonly referred to as "smart phones." However, those skilled in the art will appreciate that computing devices 400 may correspond to a wide variety of devices or components that are capable of initiating, receiving or facilitating communications over a wired and/or wireless communication network including, but not limited to, personal computing devices, electronic book readers, handheld computing devices, integrated components for inclusion in computing devices, home electronics, appliances, vehicles, machinery, land line telephones, VoIP telephones, cordless telephones, cellular telephones, feature phones, modems, personal digital assistants, laptop computers, tablet computers, gaming devices, media players and the like. In an illustrative embodiment, the computing devices 400 include a wide variety of software and hardware components for establishing communications over one or more communication networks, including communications network 306. Communications network 306 may be a wireless communications network, a wired communications network, an IP-based wireless communications network or any combination thereof. Illustrative components of computing device 400 will be described in greater detail with regard to FIG. 4. Although the present disclosure refers to a computing device 400, one skilled in the relevant art will appreciate that a computing device may in some instance herein correspond to, or otherwise be referred to as, a mobile communication device, a wireless computing device or a wireless device. Accordingly, reference to a computing device 100, 200, 400 or 700 should not be interpreted as limiting to any particular functionality, operation or type of device, whether wired or wireless, or whether having advanced computing ability/connectivity.

In an illustrative embodiment, the operating environment 300 can include any number of additional components, systems and/or subsystems for facilitating communications with the computing devices 400, the network data sources 302, the application service 310 and/or the supplemental content service 312. The additional components can include one or more switches or switching centers (in GSM embodiments, Mobile Switching Centers (or MSCs)) for establishing communications with the computing devices 400 via wireless communication network, such as a cellular radio access network, an IP-based wireless communication network based on the family of IEEE 802.11 technical standards ("WiFi") or IEEE 802.16 standards ("WiMax"), a converged wireless communications network such as Unlicensed Mobile Access ("UMA") or General Access Network ("GAN") and other wired and wireless networks. The operation of wireless communication networks are well known and will not be described in greater detail. Although not shown, a switching center may include interfaces for establishing various communications with other networks, such as the Internet, intranets, private networks, mesh networks and point-to-point networks. Although the network 306 is illustrated as a single communication network, one skilled in the relevant art will appreciate that the network may be made up of any number of wired or wireless communication networks, public or private communication networks and/or network connections.

Figure 4:
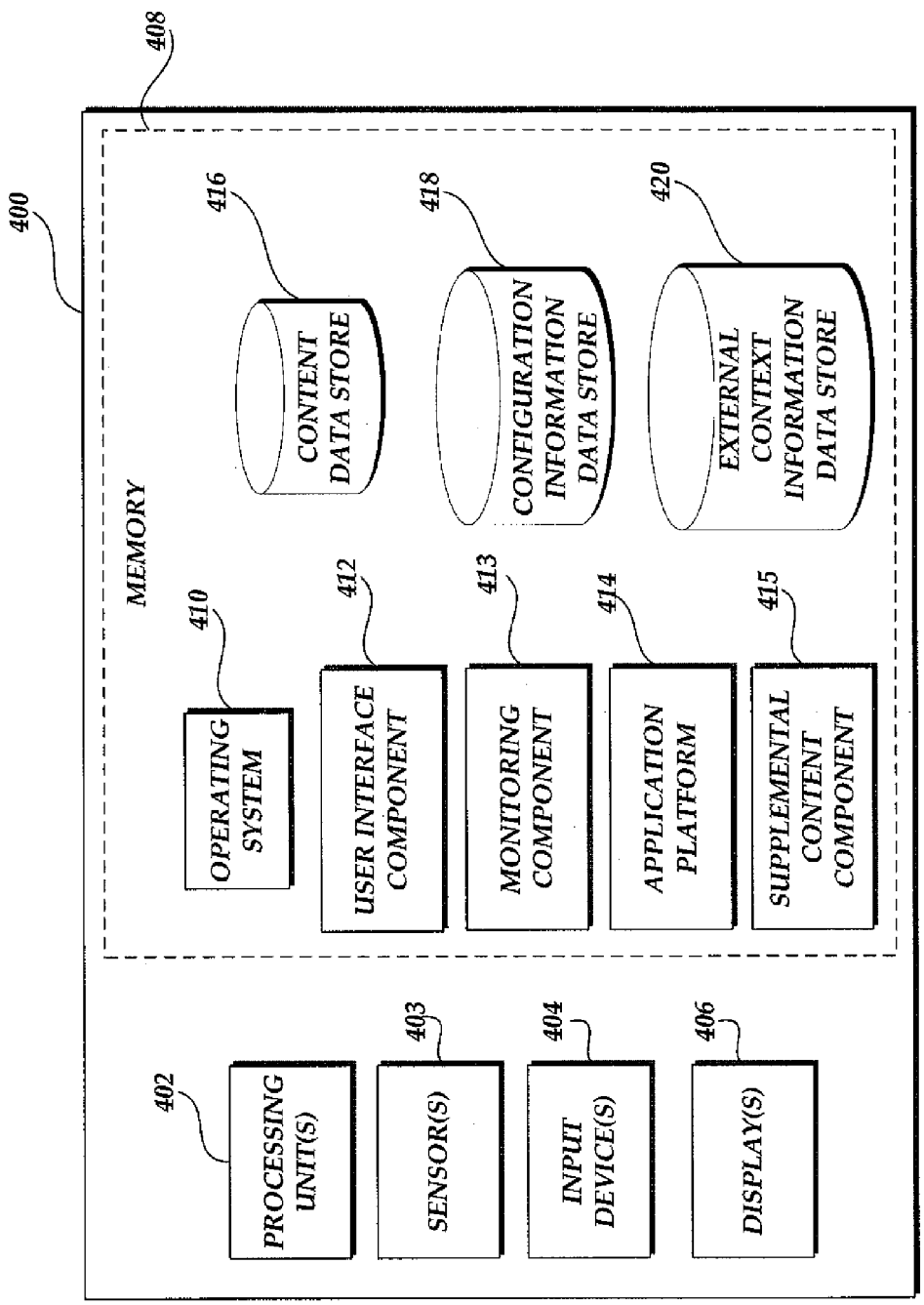
FIG. 4 is a block diagram illustrative of components of a computing device for use in presenting a content item in a first orientation and presenting supplemental content to the content item in a second orientation.

With reference now to FIG. 4, illustrative components of a computing device 400 for use in requesting supplemental content data and presenting the supplemental content related to the content item in a second orientation will be described. The computing device 400 may include one or more processing units 402, such as one or more CPUs. The computing device 400 performs functions by using the processing unit(s) 402 to execute instructions found in program components stored in the memory 408. The computing device 400 may also include one or more sensor(s) 403 (e.g., an accelerometer, a gyroscope, a gravimeter, an infrared sensor, a microwave sensor, an ultrasonic sensor, camera, etc.), one or more input devices 404 (e.g., keyboard, mouse device, specialized selection keys, touchscreen display, stylist, joystick, game controller, microphone, camera, etc.) and one or more display(s) 406 (e.g., liquid crystal display, LED display, electronic paper display, etc.). Any one or combination of such input mechanisms 403, 404 may generate an indication/signal that may be used to recognize a user interaction with the computing device 400 has occurred that is appropriate to cause presentation of supplemental content in a second orientation on the display 406 of the computing device 400. Accordingly, when such an indication is received during presentation of a content item in a first orientation, presentation in a second orientation of supplemental content related to the content item is triggered.

The computing device 400 may also include a memory 408, which may correspond to any combination of volatile and/or non-volatile storage mechanisms. The memory 408 may store various program components and data necessary for operating the computing device 400, obtaining supplemental content, presenting content items and supplemental content and publishing supplemental content to other computing devices. For example, the memory 408 may contain an operating system component 410 and program components such as a user interface component 412, a monitoring component 413 and a supplemental content component 415. Memory 408 may also store or have access to an application platform 414 that hosts one or more applications (either pre-installed on the computing device 400 or downloaded from one or more application services 310) for implementation by the computing device 400.

In addition to the program components, memory 408 may store or have access to content and/or supplemental content information for presentation in various orientations on the display 406 of the computing device 400. For example, memory 408 may include or have access to a content data store 416 that stores content items (or links thereto) to be presented in a first orientation, as well as supplemental content related to said content items that is to be presented in a second orientation.

Memory 408 may also include or have access to a configuration information data store 418 that stores information used by the computing device 400 to configure the presentation of supplemental content in a second orientation, or any of numerous other orientations, following detection of user interaction with the computing device 400 in accordance with the present disclosure. Such configuration information may include, but is not limited to, metadata associated with the content item presented in the first orientation, watermarking data associated with the content item presented in the first orientation, contextual data associated with the content item presented in the first orientation, user supplied configuration data, third party supplied configuration data, user profile data, device profile data, content profile data and the like. Accordingly, and as will be described in more detail below, when a user interaction (such as rotation of the computing device 400) is detected by the monitoring component 413 during presentation of a content item in the first orientation with respect to the display, the computing device 400 may retrieve configuration information from the configuration information data store 418 to obtain supplemental content related to the content item to be presented in the second orientation. In one embodiment, the configuration information identifies what information is to be included in the supplemental content. The supplemental content information may be retrieved from the content data store 416 or may be retrieved from an external data source, such as one or more network data sources 302 or the application service 310. The configuration information may alternatively or additionally include formatting information that defines how the supplemental content information is to be presented in the second orientation.

Figure 7A:
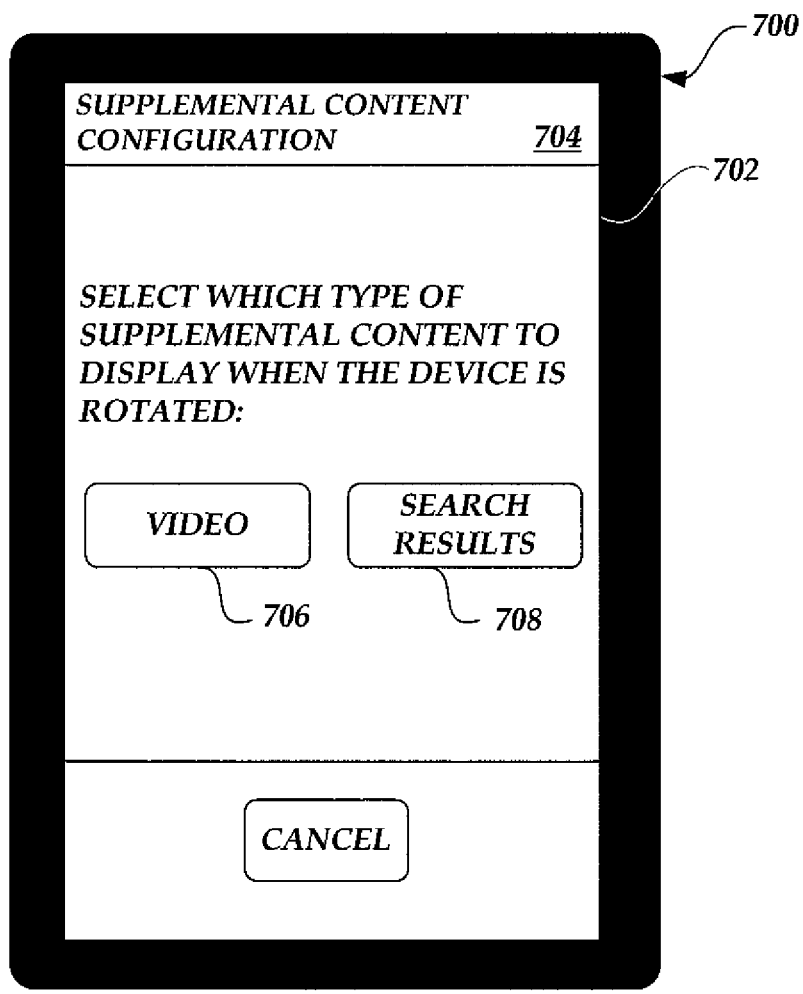
FIGS. 7A, 7B and 7C are illustrative user interfaces generated on the computing device that prompt a user to provide information for configuring supplemental content to be displayed to a user.
Figure 7B:
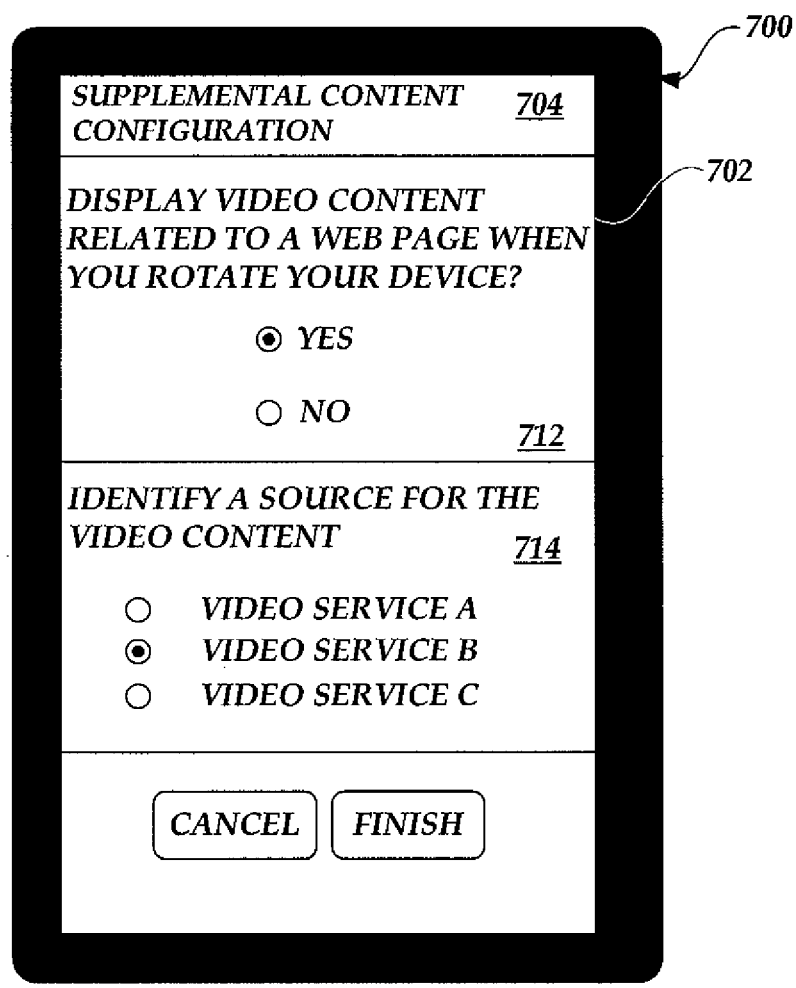
Figure 7C:
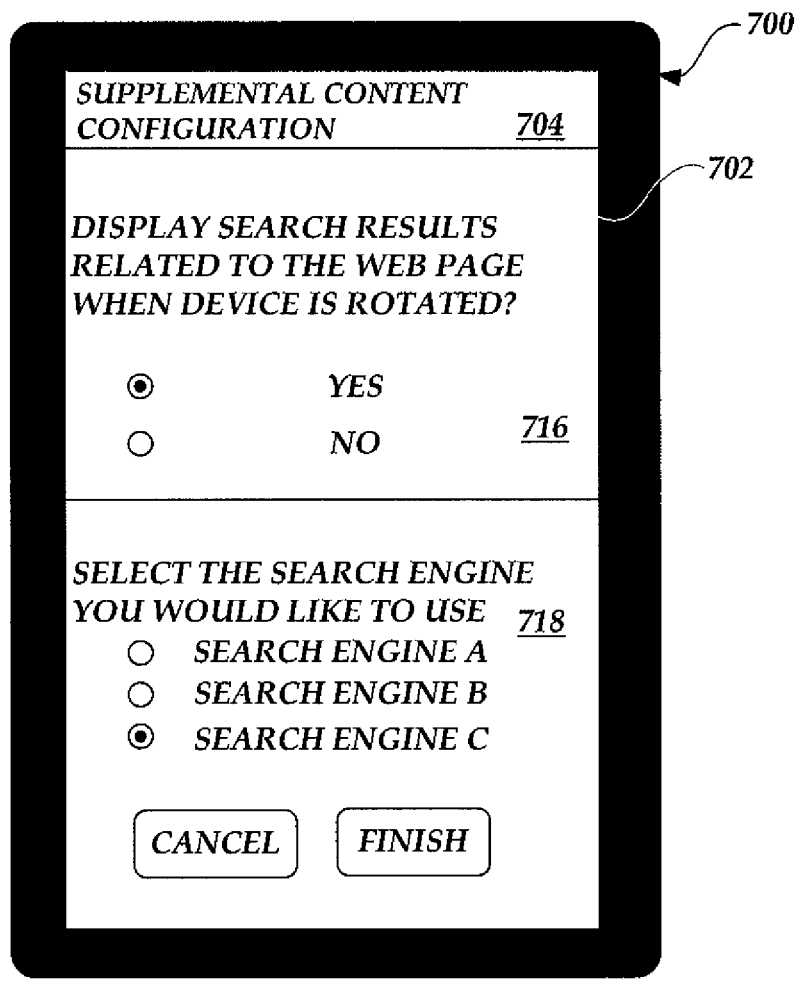

In some embodiments, the configuration information supplied by the user (and/or others) is generated using a software development tool or configuration application that is made available to users, potentially through a supplemental content configuration user interface, along with the content item that is to be subject to the presentation of the supplemental content. An example of such a configuration application is depicted in FIGS. 7A-7C and will be described in more detail below. In other embodiments, the configuration information is supplied by a third party, such as a provider or developer of the content item subject to the presentation of the supplemental content, or by other users who have consumed the content item subject to the presentation of the supplemental content. In such embodiments, the configuration information may be maintained by the supplemental content service 312 (which may have obtained the configuration information from another computing device 400, network data source 302 or the application service 310) and provided to the configuration information data store 418. In yet other embodiments, the configuration information may be derived from a profile of the user maintained in memory 408 of the computing device 400, maintained by the supplemental content service 312 or maintained by another network data source 302. The user profile data may include various information describing the user's preferences for content, websites, services, applications, etc. and thus, may be used to configure how and what supplemental content information is to be presented in the second orientation on the user's computing device. Content profile data and device profile data may similarly be used.

In addition to, or in lieu of, the foregoing configuration information, metadata associated with the content item subject to the presentation of the supplemental content may be used to configure what and how the supplemental content is to be presented in the second orientation. For example, if the content item presented in the first orientation is an eBook, the metadata associated with the eBook (e.g., the author, title, ISBN number, publication date, distribution date, main characters, synopsis, image of book jacket, etc.) may be used to configure how and what supplemental content information is to be presented in the second orientation. The metadata can also include contextual content information, such as places, people, things or times referenced in specific portions of the content or the content as a whole. Contextual content information may include, but is not limited to, data that helps interpret the content item, facts or circumstances that surround or are related to the content item, conditions under which a content item was created presented or experienced and an environment or setting in which a content item was created. The contextual content information could also include the portion of the book currently being read, which could be referenced by page number or location or the actual content at that location. For example, if the content on a page of an eBook being presented to the user relates to actions happening in New York City, N.Y., the supplemental content information could include information about New York City such as the current weather, news or publicly accessible wiki information. In yet another embodiment, the metadata information may include watermarking data associated with the initial content item. For example, if the initial content item is a movie, the movie may be digitally watermarked and the digital watermark may contain information that can be extracted and used to determine how and what supplemental content information is to be presented in the second orientation. For example, the watermark might be used to identify contextual information such as particular objects in the portion of video (e.g. places, people, items, products, etc.) that can be used to determine what supplemental content information to display with respect to the content item when the user is viewing that particular portion of the content. In a further embodiment, in place of or in addition to the watermarking data, image recognition techniques can be used to extract metadata from images or video, and audio recognition techniques can be used to extract metadata from audio.

According to one example, a user may be viewing a movie in one orientation of the device (e.g. landscape) when the user notices a particular shoe being worn by one of the actresses that the user would like to find more information about and potentially purchase. In this example, the shoe, or similar shoes, may be recognized by the previously mentioned techniques (e.g. watermarking, image recognition, etc.). The user can then rotate the device to a second orientation (e.g. portrait) and product details of the shoe, pricing and an option to purchase the shoe can be displayed. In some embodiments, the identified contextual item(s) need not be currently in the frame of the movie, but may have been previously displayed within some time window before the user oriented the device in the second orientation. In cases in which there are many items that the user might be interested in, the user may be initially presented with a list of items in the second orientation for selection by the user.

Referring again to FIG. 4, the input devices 404 of the computing device 400 may also be used to detect external context information associated with the device or user. In some embodiments, that external context information is stored in the external context information data store 420. External context information is an additional type of metadata that is used to configure what and how the supplemental content is to be presented in the second orientation. The external context information can be, for example, a location of the device, a determination of the user of the device, the speed of the device, the ambient temperature around the device, a time of day, a day of the year, a season of the year, the ambient light around the device, among many other possibilities. This information can be detected by any number of input devices 404, such as global positioning system (GPS) sensors, signal strength sensors (i.e. to determine proximity to one or more fixed position wireless transmitters), thermometers, cameras, light sensors, clocks, among other possibilities.

According to one example in which external context information can be used to configure what and how the supplemental content is to be presented in the second orientation, imagine that a user is reading an eBook about sailing. Additionally, this user is reading the book in the morning, while located in the city of Seattle, Wash., on a very cold day. In this example, the device can detect from its internal clock that it is the morning, from its integrated GPS sensor that it is located in Seattle and from a remote service (or integrated temperature sensor) that it is 32° F. in Seattle. When the device is moved into the second position, instead of providing supplemental content that is generically related to sailing, the supplemental content is now selected based off of these additional factors and/or indications from sensors 403 and/or input devices 404. Thus, in the second orientation, the user may be presented with photographs of sailboats located in Seattle's Lake Union, with a sunrise in the background and crew members dressed in heavy coats. In contrast, the same user reading that book on a warm summer evening along the sugary coast of Panama City Beach, Fla. may be presented with photographs of a sailboat, adorned with short-pants wearing passengers, coasting into a fiery sunset. It should be understood that further embodiments can use both contextual content information and external context information to configure what and how the supplemental content is to be presented in the second orientation. Thus, for example, both the context of the people, places, and time of the content being consumed can be used in combination with the people, places and time that the content is being consumed on the device.

The above enumerated list of program components and data stores is representative and is not exhaustive of the types of functions performed, components implemented by the computing device 400 or the data stores accessible by the computing device 400. One skilled in the relevant art will appreciate that additional or alternative program components and data stores may be included in the computing device 400 to carry out other intended functions without departing from the scope of the present disclosure. Moreover, although the data stores depicted in FIG. 4 are depicted as being local to the computing device 400, those skilled in the art will appreciate that all or a portion of one or more of the data stores may be remote to the computing device 400. For example, in one embodiment, all or a portion of at least one of the depicted data stores is maintained by the supplemental content service 312. Finally, the supplemental content component 415 may be equivalent in functionality to the content request processing component 318 (and or other components) of the supplemental content service 312. Alternatively, the content request processing component 318 may have more limited functionality and/or specialized functionality, such as functionality to implement peer-to-peer communication.

Figure 5:
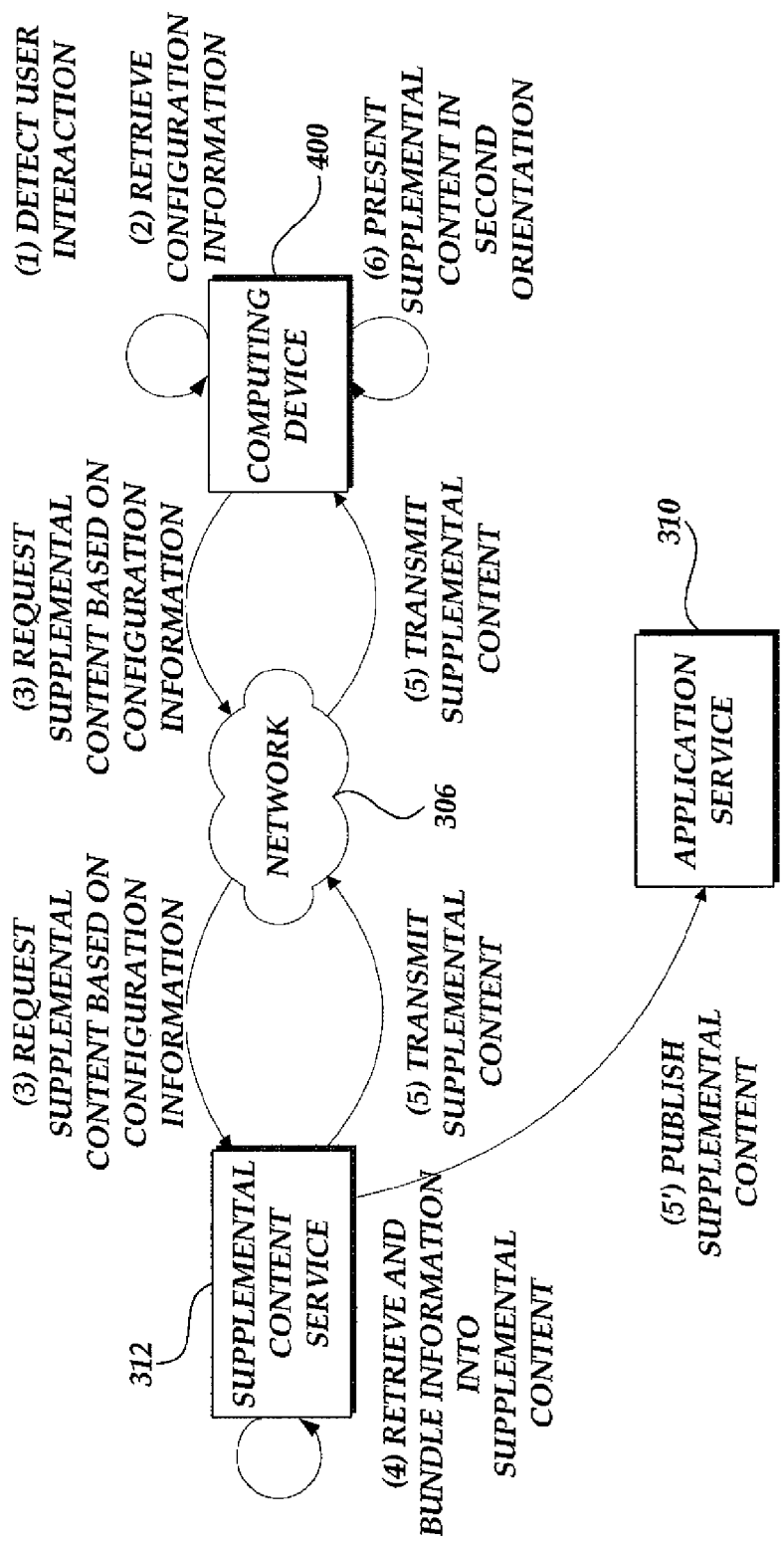
FIG. 5 is a block diagram of an illustrative interaction between components of the operating environment depicted in FIG. 4 after a user interaction with the computing device is detected.

FIG. 5 is a block diagram of an example interaction between various components of the operating environment 300 after a user interaction with the computing device 400 is detected, and the detection has occurred during presentation of a content item in a first orientation on the display 406 of the computing device 400. As described above, the monitoring component 413 stored in memory 408 monitors inputs generated by an input mechanism, such as a sensor 403, an input device 404 or a software control presented with the content item to detect user interaction with the computing device 400. In the example illustrated in FIGS. 1 and 2, the input mechanism is the sensor 403, and the sensor 403 is an accelerometer. Accordingly, when the user rotates the computing device 400 from a portrait position to a landscape position (or vice versa), while the initial content item (e.g., the movie illustrated in FIG. 1 and the webpage illustrated in FIG. 2) is being presented, the supplemental content component 415 of the computing device 400 retrieves configuration information for supplemental content related to the content item from the configuration information data store 418 of the computing device 400 or from a location remote from computing device 400. The supplemental content component 415 of the computing device 400 then requests the supplemental content based on the retrieved configuration information. As described above, the configuration information is information used to define how and what supplemental content information is to be presented in the second orientation on the display 406 of the computing device 400. The request for supplemental content is submitted via the network 306 to the supplemental content service 312 for further processing.

Although the above embodiment of computing device 400 retrieves content configuration information from configuration information data store 418 of the computing device 400, in some embodiments, at least some of the configuration information is stored at the supplemental content service 312 or is otherwise remotely accessible by the supplemental content service. In such an embodiment, device 400 detects the user interaction indicating the need for retrieving the supplemental content for display in the second orientation and thereafter requests the supplemental content based on configuration information. However, the computing device 400 itself may not retrieve all of the configuration information (e.g. as depicted in step "2"). Rather, supplemental content service 312 can directly retrieve at least some of the configuration information, which can be stored at the supplemental content service 312 or can be otherwise remotely accessible by the supplemental content service, in order to retrieve and bundle the information into supplemental content that is transmitted back to the device.

In some embodiments, the supplemental content component 415 obtains the entire supplemental content for the initial content item following detection by the monitoring component 413 of the user interaction with the computing device 400. However, in other embodiments, the supplemental content component 415 obtains at least a portion of the supplemental content prior to any such detection and stores the portion of the supplemental content in the content data store 416. In such embodiments, the supplemental content component 415 obtains any remaining information to be included in the supplemental content (e.g., from a network data source 302) after the user interaction with the computing device is detected (provided that said detection occurs while the content item subject to the presentation of the supplemental content is being presented in the first orientation).

As described above, the content processing component 318 of the supplemental content service 312 retrieves the information defined by the configuration information and bundles the retrieved information into supplemental content. The information may be retrieved from the supplemental content data store 314 and/or external sources such as computing devices 400, network data sources 302 and application service 310. The supplemental content service 312 then transmits the supplemental content via the network 306 to the computing device 400 for presentation in a second orientation on the display 406 of the computing device 400. Upon receipt, and thus, after detection of the user interaction with the computing device, the user interface component 412 of the computing device 400 presents the supplemental content in the second orientation on the display 406 of the computing device 400. As noted above, in some embodiments, all or a portion of the information included in the supplemental content is obtained by the computing device 400 prior to detection of the user interaction. In such embodiments, the previously obtained information for the supplemental content is retrieved from the content data store 416 directly by the computing device 400 following detection of user interaction with the computing device in accordance with the present disclosure. As also described above, the supplemental content may include the information to be presented in the second orientation itself and/or links thereto. Accordingly, the supplemental content may be dynamically assembled as it is being presented in the second orientation.

As also shown in FIG. 5, the supplemental content service 312 may publish the supplemental content to an application service 310 or other external service for use by others. Accordingly, when another user is presented with the same or similar content item in a first orientation on his or her own computing device, the published supplemental content may be presented in a second orientation on the computing device of the other user when the user interacts with his or her computing device. Such published supplemental content may take the form of a software application that may be made available to others via the application service 310. Accordingly, other users may obtain the published supplemental content from the application service 310 so that any time the user is presented with the content subject to the supplemental content, the supplemental content is presented to the user in the second orientation. For instance, in the example illustrated in FIG. 1, the user of computing device 100 may have downloaded to the computing device 400 an application that provides the supplemental content 114 presented in the portrait orientation from the application service 310. In other instances, the application that provides the supplemental content presented in the second orientation may be downloaded along with the initial content item that is presented in the first orientation (e.g., the landscape orientation illustrated in FIG. 1). In yet other instances, the application that provides the supplemental content presented in the second orientation may be stored in the content data store 416 of the computing device 400 upon acquisition of the device by the user. In each of these instances, however, the application that provides the supplemental content may be a file that is separate from the initial content item. In one embodiment, the application that provides the supplemental content (e.g. content enhancements) in the second orientation is generated using systems, devices and processes (collectively, "techniques") described in commonly owned, U.S. patent application Ser. No. 13/047,017, entitled Content Enhancement Techniques, filed Mar. 14, 2011, the entirety of which is incorporated herein by reference.

In yet other embodiments, a published supplemental content may be further modified based on feedback by other users who have reviewed and/or otherwise been presented the supplemental content. In such cases, a group or community of users may modify the supplemental content and/or make suggestions to modify the supplemental content. Such feedback may be utilized by the supplemental content service 312 (or an administrator of the content enhancement service) to modify the supplemental content for future users thereof. In other embodiments, the user who initially requested the supplemental content or a developer or provider of the content item itself may implement modifications to the supplemental content and publish the supplemental content as an application to the application service 310 for use and download by others.

In yet other embodiments, other users, rather than modify or generate supplemental content, may make information available to others for generation of supplemental content. For example, such users may make such information available at an external network data source, such as network data source 302, via application programming interfaces (APIs). Accordingly, the configuration information for the supplemental content may include various API calls to such external data sources.

In yet other embodiments, the supplemental content service 312 may receive, from multiple computing devices 400, a plurality of requests for supplemental content associated with the same or similar content items. In such cases, the supplemental content service 312 may determine which supplemental content is suitable for the content item among those that have been previously generated for the content item and obtain the supplemental content from the supplemental content data store 314 or an external network data source 302. For example, the supplemental content service 312 may select the most recent supplemental content generated for the content item, the most frequently presented supplemental content for the content item or the supplemental content authorized by a provider of the content item. The supplemental content service 312 may then transmit the suitable supplemental content for the initial content item to at least one of the computing devices 400 that requested the supplemental content data.

Figure 6:
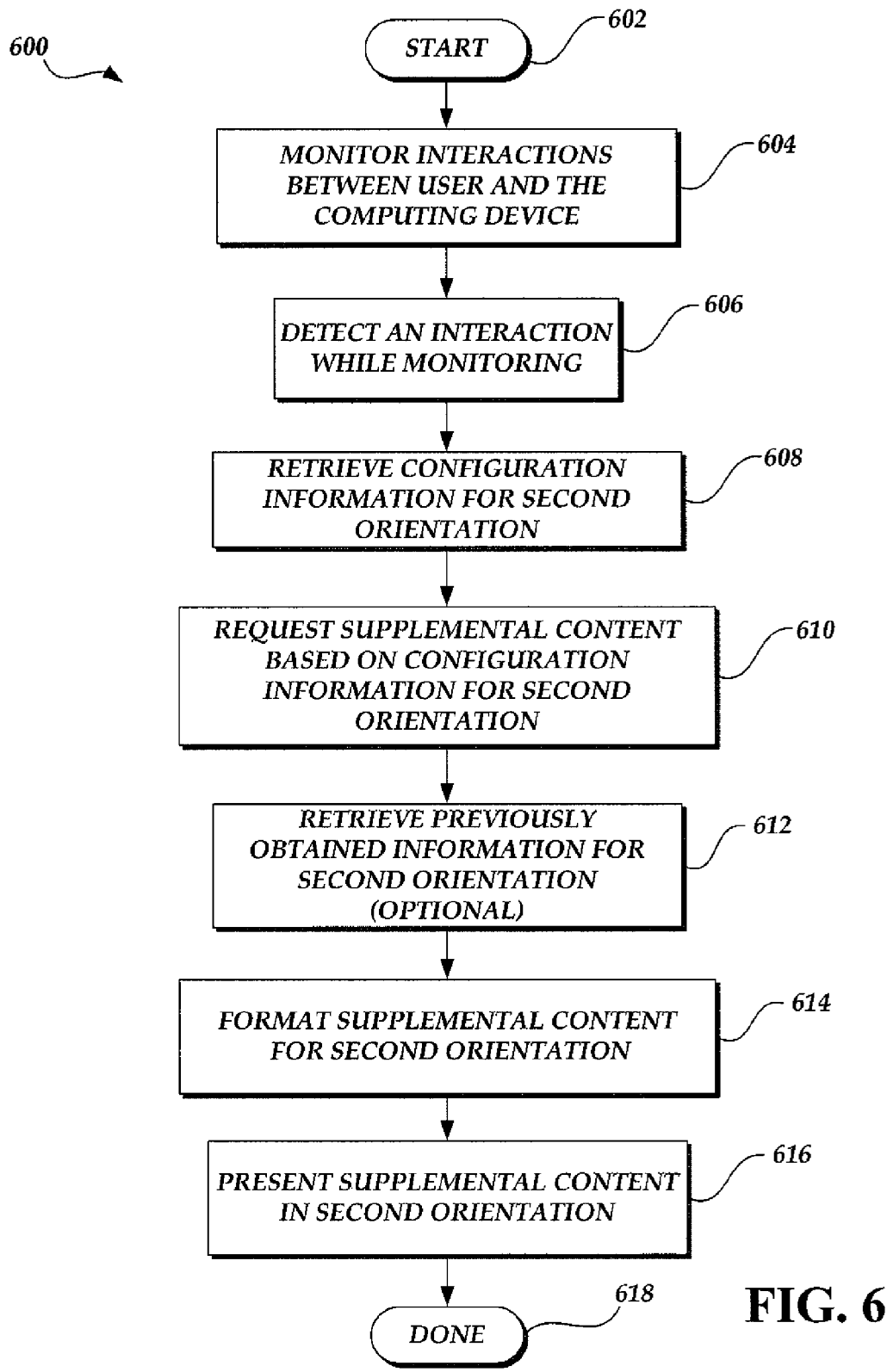
FIG. 6 is a flow diagram of an illustrative method for obtaining a supplemental content item for presentation in the second orientation.

Referring now to FIG. 6, an illustrative method 600 for obtaining a supplemental content item to be presented in the first orientation is depicted. In one embodiment, the method 600 is implemented by the computing device 400. The method 600 begins in a block 602 and proceeds to a block 604 in which interactions between the user and user's computing device are monitored (e.g., via the monitoring component 413 of the computing device 400). As described above, in one embodiment, the monitoring component 413 monitors interactions between the user and the computing device while a content item is being presented in a first orientation with respect to the display 406 of the computing device 400. Once such an interaction (e.g., such as rotation of the computing device 400 as registered by an accelerometer or other sensor detector 403) is detected in a block 606, configuration information is retrieved in block 608 from the configuration information data store 418. The retrieved configuration information describes how and what supplemental content information is to be presented in the second orientation on the display 406 of the computing device 400. In the illustrated method, once the configuration information is retrieved, supplemental content is requested in block 610 based on the configuration information. As described above, the supplemental content service 312 may provide the supplemental content to the computing device in response to this request. In some embodiments, previously obtained supplemental content information may also be retrieved for inclusion in the supplemental content for presentation in the second orientation in a block 612. Next, in block 614, the supplemental content, including any previously obtained supplemental content information, may be formatted for presentation in the second orientation on the display 406 of the computing device 400. Once formatted, the user interface component 412 of the computing device 400 may present the supplemental content in the second orientation on the display 406 of the computing device 400. As a result of method 600, the supplemental content for the initial content item is automatically presented in the second orientation 616 following detection of user interaction with the computing device 400, the detection occurring while the content item was being presented in the first orientation with respect to the display of the device. The automatic presentation of the supplemental content frees the user from affirmatively seeking or searching for the information contained in the supplemental content. In addition, the supplemental content enables the provider of the content to avoid including superfluous information related to the content item when the content item is presented in a first orientation. Following presentation of the supplemental content in the second orientation, the method 600 ends in block 618.

As noted above, a user can configure the presentation of supplemental content in a second orientation. In one embodiment, a user may utilize a supplemental content configuration user interface of a configuration application to configure how and what information is to be included in supplemental content that is to be presented in a second orientation. The supplemental content configuration user interface for the content item may be downloaded from the application service 310 along with the content item, when the content item is itself an application. In yet another embodiment, supplemental content configuration user interface is made available by the supplemental content service 312 or from another network data source 302, such as a website that the user frequently browses. In yet another embodiment, the configuration application that includes the supplemental content configuration user interface is installed on the computing device 400 and is agnostic to any particular content items or providers of content items, and thus, can be used to configure supplemental content for any initial content item obtained and presented by the computing device 400.

With reference to FIG. 7A, a supplemental content configuration user interface 704 offered by a website the user frequently browses is illustrated. In some embodiments, the options can be pre-selected, but the supplemental content configuration user interface allows the user to manipulate what supplemental content is to be displayed. In the illustrated example, the supplemental content configuration user interface 704 is presented on a display 702 of a computing device 700 and is used to configure supplemental content for content items, e.g., webpages retrieved from the frequently browsed website, such as the webpage depicted in FIG. 2. As such, the supplemental content configuration user interface 704 prompts the user with a message to configure how and what information the user would like to see displayed when the user rotates the device from a landscape (first) position to a portrait (second) position while browsing a webpage on the website (and vice versa). If the user wishes to proceed with making appropriate edits to the configuration, the user may select the "video" button 706 or the "search results" button 708. If the user selects the "video" button 706, the user interface shown in FIG. 7B is displayed to the user. If the user selects the "search results" button 708, then the user interface depicted in FIG. 7C is displayed to the user.

As shown in FIG. 7B, the supplemental content configuration user interface 704 will then prompt the user with options 712 to see video content that may be related to the initial content item (e.g., the webpage being browsed). Accordingly, if the user would like to see displayed video content related to the webpage being browsed when he or she rotates her device, the user may select the corresponding "Yes" option. In the illustrated example, if the user selects the "Yes" option, the supplemental content configuration user interface 704 also prompts the user to select a video content source from which to retrieve the supplemental content that the user would like to view after rotating his or her computing device 700. Accordingly, the user may select from options 714 to select a source for the video content. In one embodiment, the source is a video content sharing service, a social networking service, some other network service or any other website from which video content may be downloaded or streamed. In other embodiments, instead of selecting only a source, the user may enter or browse for a link to a particular item of video content available from a source. In other instances, the user may enter or browse for a link to a source of video content itself, in which case context information or other metadata associated with the webpage may be used to search for and identify an item of video content. In either case, the supplemental content for the webpage may be configured to include video content related to the webpage and/or in which the user is interested. Accordingly, each time the user rotates the computing device 700 while browsing the website, video content identified using the provided link will be presented in the second orientation on the display of the computing device 700. In other embodiments, each time the user rotates the computing device 700, additional supplemental content is displayed on computing device 700. In other embodiments, each time the user rotates computing device 700, different supplemental content is displayed on device 700. When the user has completed configuring the video content to be displayed as the supplemental content, the "Finish" button can be selected to exit the supplemental content configuration user interface.

As shown in FIG. 7C, displayed when the user selects the "search results" button 708 of FIG. 7A, the supplemental content configuration user interface 704 prompts the user with options to see search results related to the contents of the webpage when the user rotates his or her computing device 700. If the user would like to see such search results, the user may select a "Yes" option from a list of options 716. In the illustrated example, the supplemental content configuration user interface 704 may also prompt the user to select a search engine that the user would prefer to generate the search results from a list of search engine options 718. Once the user selects the desired search engine, the user may complete configuration in the illustrated example by selecting the "Finish" button. Selecting the "Finish" button in either FIG. 7B or 7C causes the configuration information to be stored for later use. In some embodiments, the configuration information is stored in configuration information data store 418 (FIG. 4), while in other embodiments the configuration information is stored remote from the device (e.g. at the website used to configure supplemental content, within a cloud-based storage service or other network accessible data storage). In embodiments in which the configuration information is stored remote from device 400, the configuration information can be accessed directly by supplemental content service 312 in order to determine what supplemental content to supply and how to supply them as described with respect to FIG. 5 above. Regardless of which mechanism is used, in this example, whenever a user interaction with computing device 700 is detected during presentation of a webpage from the frequently browsed website, the user will automatically be presented a video related to the webpage in a second orientation on the display 702, as well as search results related to the webpage as generated by the user's preferred search engine. In practice, the user may retrieve a webpage from the website at a first universal resource locator (URL). When the device detects the user interaction indicating that supplemental content is to be displayed in a second orientation, a request including a second URL is passed to the website indicating such. The supplemental content service then retrieves the configuration information to determine the supplemental content to send back to the computing device and transmits the supplemental content for display in the second orientation in response to the request.

Those skilled in the relevant art will appreciate that the supplemental content configuration user interface 704 depicted in FIGS. 7A-7C and described above is an illustrative supplemental content configuration user interface only and that different configuration applications may be used for different content items, different types of content items, different supplemental content and different types of supplemental content. In addition, configuration applications may include more, less or different configuration options that those depicted in FIGS. 7A-7C, and the configuration options may depend on the initial content item(s) to be provided with supplemental content, the supplemental content desired and/or the provider/developer of the configuration application. Although not shown, configuration applications may further enable a user, developer or provider to configure the user interaction with the computing device that will trigger the presentation of a supplemental content in a second orientation. For example, rather than triggering such presentation based on rotation of the computing device, presentation may be triggered based on a detection of an audible command, image detection of a user gesture, selection of an existing software control (e.g., dragging of a scroll bar), a keyboard action (e.g., pressing a "page down" key) or some other manipulation of an input device (e.g., shaking of the computing device rather than rotating the computing device). According to some embodiments, the user input that triggers the presentation of the supplemental content could also be the detection of a user's eye gaze direction (e.g. via a camera), the movement of a user in relation to a camera associated with the computing device (e.g. a gesture, head movement, body movement, etc.) or the movement of the camera of the computing device in relation to a user. Likewise, the supplemental content that is displayed in the second orientation can be determined, at least in part, based on the gaze direction of the user. For example, if the user is looking at a particular object in an image in the first orientation, the supplemental content displayed in the second orientation may include content about that particular object. Those skilled in the art will appreciate that the foregoing examples are illustrative only and are not to be construed as limiting. Furthermore, although the example supplemental content configuration user interface guides the user to configure how and what information the user would like to see when the user rotates the device from a landscape (first) position to a portrait (second) position, other supplemental content configuration user interfaces can guide the user to configure how and what information the user would like to see in any number of possible orientations or ranges of orientations (e.g., when rotated to a third position, pricing and availability information is displayed).

Those skilled in the art will also appreciate that presentation of the initial content item, as well as presentation of the supplemental content may vary depending on the type of computing device or the display of the computing device. For example, the display may be a projector or television that is remotely connected to the computing device, as opposed to integral with the computing device. Accordingly, presentation of the supplemental content item by the projector or television may be triggered by selecting a "page down" key on the computing device. As yet another example, the supplemental content may be presented concurrently with the content item in the display of the computing device (whether the display is integral or not) using a split-screen. As yet another example, the display of the computing device may actually be two or more displays, such as when a desktop computer is equipped with two monitors. In such cases, the content item may be presented on a first monitor, while the supplemental content may be presented on the other monitor, and the orientation in which the content item is presented on the first monitor may be the same or different as the orientation in which the supplemental content is presented on the other monitor.

As used herein, the terms "electronic book" and/or "eBook" include electronic or digital representations of printed works, as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, webpages and so forth. Accordingly, the terms "electronic book" and/or "eBook" may include any readable or viewable content that is in electronic or digital form. One example of the present disclosure allows a student to read text when a device is in a first position. When the device is rotated to a second position, the student would see a video related to the text. If the device is rotated again to a third position, a test could be presented to the student.

All of the processes described herein may be embodied in, and fully automated, via software code components or modules executed by one or more general purpose computers or processors. The code components or modules may be stored in any type of computer-readable, non-transitory storage medium or other computer storage device. Some or all of the methods may alternatively be embodied in specialized computer hardware. In addition, the components or modules referred to herein may be implemented in hardware, software, firmware or a combination thereof.

Conditional language such as among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, components, segments or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in a relevant art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for presenting content, the system comprising:
    one or more data stores that store at least a plurality of secondary media content items; and
    a computing device in communication with the one or more data stores, said computing device operative to:
    determine initial network page content presented in a first orientation in relation to a display of a remote computing device, wherein the initial network page content is associated with an item;
    receive, from the remote computing device, a request for secondary content to be presented on the display of the remote computing device while the initial network page content is being presented in the first orientation in relation to the display of the remote computing device, wherein the request for secondary content is based at least in part on a detected initiation of a second orientation in relation to the display of the remote computing device, and wherein the detected initiation of the second orientation in relation to the display of the remote computing device is determined based at least in part on first input data from an orientation sensor of the remote computing device;
    in response to the request for secondary content, select a secondary media content item from the plurality of secondary media content items associated with the item, and wherein the secondary media content item is configured to be presented in the second orientation in relation to the display of the remote computing device, and wherein the secondary media content item is obtained from the one or more data stores;
    transmit the secondary media content item to the remote computing device for automatic presentation in the second orientation in relation to the display of the remote computing device, wherein the secondary media content item is automatically presented on the remote computing device;
    receive, from a second remote computing device, a second request for secondary content, the second request comprising an indication of the initial network page content;
    in response to the indication of the initial network page content, generate a determination that the initial network page content was previously associated with the secondary media content item;
    select the secondary media content item based at least in part on the determination; and
    transmit the secondary media content item to the second remote computing device.

2. The system of claim 1, wherein said computing device is further operative to publish the secondary media content item to an application service upon which multiple applications are made available, and wherein the secondary media content item is published as an application.

3. The system of claim 2, wherein said computing device is further operative to obtain feedback regarding the secondary media content item.

4. The system of claim 3, wherein said computing device is further operative to publish, to the application service, the secondary media content item updated in accordance with the feedback, and wherein the updated secondary media content item is published as an application.

5. The system of claim 1, wherein at least one of the one or more data stores comprises an external data store from which data is obtained via one or more application programming interfaces.

6. The system of claim 1, wherein said computing device is further operative to:
receive a plurality of requests for secondary content associated with the same or similar initial network page content, wherein the plurality of requests are received from a plurality of remote computing devices;
determine which of the plurality of secondary media content items are suitable for the same or similar initial network page content;
obtain at least one secondary media content item suitable for the same or similar initial network page content from the one or more data stores; and
transmit the at least one secondary media content item suitable for the same or similar initial network page content to at least one of the remote computing devices that requested secondary content.

7. The system of claim 1, wherein the orientation of the initial content and the orientation of the secondary content in relation to the display correspond to different angular positions in relation to the display.

8. A computer-readable, non-transitory storage medium storing computer executable instructions that when executed by a hardware processor perform operations comprising:
causing presentation of initial network page content on a display of a computing device when the computing device is in a first orientation, wherein the initial network page content is associated with an item;
receiving, from the computing device, a request for secondary content to be presented on the display of the computing device while the initial network page content is being presented in the first orientation, wherein the request for secondary content is based at least in part on a detected initiation of a second orientation in relation to the display of the computing device, and wherein the detected initiation of the second orientation in relation to the display of the computing device is determined based at least in part on first input data from an orientation sensor of the computing device;
selecting a secondary media content item from a plurality of the secondary media content items associated with the item, and wherein the secondary media content item is configured to be presented in the second orientation in relation to the display of the computing device, and wherein the secondary media content item is obtained from one or more data stores;
transmitting the secondary media content item to the computing device for automatic presentation in the second orientation in relation to the display of the computing device, wherein the secondary media content item is automatically presented on the computing device;
receiving, from a second computing device, a second request for secondary content, the second request comprising an indication of the initial network page content;
generating a determination that the initial network page content was previously associated with the secondary media content item;
selecting the secondary media content item based at least in part on the determination; and
transmitting the secondary media content item to the second computing device.

9. The computer-readable, non-transitory storage medium of claim 8, wherein the first orientation is one of a landscape orientation and a portrait orientation, and wherein the second orientation is different from the first orientation.

10. The computer-readable, non-transitory storage medium of claim 8, wherein selecting the secondary media content item is further based at least in part on configuration information.

11. The computer-readable, non-transitory storage medium of claim 10, wherein the configuration information comprises at least one of metadata associated with the initial network page content, watermarking data associated with the initial network page content, contextual data associated with the initial network page content, external contextual information, user supplied configuration data, user profile data, content profile data, device profile data and third party supplied configuration data.

12. A computer-implemented method comprising:
determining initial network page content presented in a first orientation in relation to a display of a computing device, wherein the initial network page content is associated with an item;
receiving, from the computing device, a request for secondary content to be presented on the display of the computing device while the initial network page content is being presented in the first orientation, wherein the request for secondary content is based at least in part on a detected initiation of a second orientation in relation to the display of the computing device, and wherein the detected initiation of the second orientation in relation to the display of the computing device is determined based at least in part on first input data from an orientation sensor of the computing device;
selecting a secondary media content item from a plurality of the secondary media content items associated with the item, and wherein the secondary media content item is configured to be presented in the second orientation in relation to the display of the computing device, and wherein the secondary media content item is obtained from one or more data stores;
transmitting the secondary media content item to the computing device for automatic presentation in the second orientation in relation to the display of the computing device, wherein the secondary media content item is automatically presented on the computing device;
receiving, from a second computing device, a second request for secondary content, the second request comprising an indication of the initial network page content;
generating a determination that the initial network page content was previously associated with the secondary media content item;
selecting the secondary media content item based at least in part on the determination; and
transmitting the secondary media content item to the second computing device.

13. The computer-implemented method of claim 12, wherein selecting the secondary media content item is further based at least in part on configuration information, wherein the configuration information comprises at least one of metadata associated with the initial network page content, watermarking data associated with the initial network page content, contextual data associated with the initial network page content, user supplied configuration data, user profile data, content profile data, device profile data and third party supplied configuration data.

14. The computer-implemented method of claim 12, wherein the second computing device comprises a remote computing device.

15. The computer-implemented method of claim 12, wherein the second media content item comprises data obtained from an external source that is remotely accessible by the computing device.

16. The computer-implemented method of claim 15, wherein the data is obtained from the external source via one or more application programming interfaces.

17. The computer-implemented method of claim 12 further comprising publishing the second media content item to an application service configured to store multiple applications, wherein the second media content item is published as an application to the application service.

18. The computer-implemented method of claim 12, further comprising:
receiving second data from the computing device, wherein the second data is associated with external contextual information about the computing device, and wherein selecting the second media content item is based at least in part on the second data.

19. The computer-implemented method of claim 12, further comprising:
accessing a network page search result associated with the item; and
presenting, on the display, the network page search result.

20. A system comprising:
a computing device comprising a hardware processor, said hardware processor operative to:
determine initial network page content presented in a first orientation in relation to a display of a remote computing device, wherein the initial network page content is associated with an item;
receive, from the remote computing device, a request for secondary content to be presented on the display of the remote computing device while the initial network page content is being presented in the first orientation in relation to the display of the remote computing device, wherein the request for secondary content is based at least in part on a detected initiation of a second orientation in relation to the display of the remote computing device, and wherein the detected initiation of the second orientation in relation to the display of the remote computing device is determined based at least in part on first input data from an orientation sensor of the remote computing device;
select a secondary media content item from a plurality of secondary media content items associated with the item, and wherein the secondary media content item is configured to be presented in the second orientation in relation to the display of the remote computing device;
transmit the secondary media content item to the remote computing device for automatic presentation in the second orientation in relation to the display of the remote computing device, wherein the secondary media content item is automatically presented on the remote computing device;
receive, from a second remote computing device, a second request for secondary content, the second request comprising an indication of the initial network page content;
generate a determination that the initial network page content was previously associated with the secondary media content item;
select the secondary media content item based at least in part on the determination; and
transmit the secondary media content item to the second remote computing device.

21. The system of claim 20, wherein the computing device is further operative to receive, from a user, a selection of a second plurality of supplemental content items for presentation when the remote computing device is in a third orientation,
wherein the computing device is further configured to cause presentation of the user selected second plurality of supplemental content items on the display of the remote computing device.

22. The system of claim 20 wherein selecting the secondary media content item is further based at least in part on configuration information, wherein the configuration information comprises at least one of metadata associated with the initial network page content, watermarking data associated with the initial network page content, contextual data associated with the initial network page content, user supplied configuration data, user profile data, content profile data, device profile data and third party supplied configuration data.

23. The system of claim 20, wherein the first orientation is one of a landscape orientation and a portrait orientation, and wherein the second orientation is different from the first orientation.

24. The system of claim 20, wherein the second media content item comprises data obtained from an external source that is remotely accessible by the computing device.

25. The system of claim 20, wherein the hardware processor is further operative to:
access a network page search result associated with the item; and
display the network page search result.

26. The system of claim 20, wherein the hardware processor is further operative to:
receive second data from the remote computing device, wherein the second data is associated with external contextual information about the remote computing device, and wherein selecting the second media content item is based at least in part on the second data.

* * * * *